United States Patent
Li et al.

(10) Patent No.: US 6,976,414 B2
(45) Date of Patent: Dec. 20, 2005

(54) METHOD AND APPARATUS FOR TRIMMING ALUMINUM SHEET

(75) Inventors: Ming Li, Murrysville, PA (US); Gregory Fata, Westland, MI (US)

(73) Assignee: Alcoa Inc., Pittsburgh, PA (US)

( * ) Notice: Subject to any disclaimer, the term of this patent is extended or adjusted under 35 U.S.C. 154(b) by 730 days.

(21) Appl. No.: 08/974,179

(22) Filed: Nov. 19, 1997

(65) Prior Publication Data

US 2002/0017173 A1 Feb. 14, 2002

Related U.S. Application Data

(62) Division of application No. 08/742,976, filed on Nov. 1, 1996, now Pat. No. 5,820,999.

(51) Int. Cl.[7] .................. B23D 15/04; B23D 33/02; B26D 1/08; B21D 28/16
(52) U.S. Cl. .................. 83/13; 83/452; 83/613; 83/694
(58) Field of Search .................. 83/13, 613, 694, 83/697, 683, 42, 55, 56, 452, 581, 636, 685, 686, 638; 72/332, 338

(56) References Cited

U.S. PATENT DOCUMENTS

| | | | | |
|---|---|---|---|---|
| 2,207,872 A | * | 7/1940 | Ostberg | 83/694 |
| 2,339,641 A | * | 1/1944 | Jensen | 83/613 X |
| 3,215,017 A | * | 11/1965 | Rutz | 83/694 |
| 3,791,248 A | * | 2/1974 | Pearson | 83/694 X |
| 3,828,633 A | | 8/1974 | Klingen | 83/56 |
| 4,043,233 A | * | 8/1977 | Seki et al. | 83/23 |
| 4,417,510 A | | 11/1983 | Sharp | 100/98 R |
| 4,485,714 A | * | 12/1984 | Eriksson | 83/697 X |
| 4,569,263 A | * | 2/1986 | Kravets | 83/581 X |
| 4,787,542 A | | 11/1988 | Ruff et al. | 225/1 |
| 4,942,798 A | * | 7/1990 | Taub et al. | 83/694 X |
| 5,010,795 A | | 4/1991 | Kania | 83/607 |
| 5,103,702 A | * | 4/1992 | Yannazzone | 83/697 X |
| 5,235,881 A | * | 8/1993 | Sano et al. | 83/55 |
| 5,327,806 A | * | 7/1994 | Houser | 83/694 X |
| 5,373,767 A | * | 12/1994 | Weisser | 83/685 X |
| 5,390,576 A | | 2/1995 | Ishibashi | 83/613 |
| 5,458,717 A | * | 10/1995 | Kurita | 83/685 X |
| 5,820,999 A | * | 10/1998 | Li et al. | 428/577 |
| 5,896,795 A | * | 4/1999 | Harhay et al. | 83/923 X |

FOREIGN PATENT DOCUMENTS

| | | | | |
|---|---|---|---|---|
| JP | 4-59138 | * | 2/1992 | 83/684 |
| JP | 4-327322 | * | 11/1992 | 83/684 |
| SU | 745608 | * | 7/1980 | 83/694 |
| WO | 90/14190 | * | 11/1990 | 83/694 |

* cited by examiner

*Primary Examiner*—Clark F. Dexter
(74) *Attorney, Agent, or Firm*—Robert A. Diaz; Eckert Seamans Cherin & Mellott, LLC

(57) ABSTRACT

A method and apparatus are provided for reducing or eliminating sliver formation during aluminum sheet trimming operations. By controlling parameters such as trimming angle and cutting blade clearance, aluminum sheet can be trimmed while substantially eliminating the formation of slivers which damage the surface finish of the part. Cutting angle and clearance are preferably selected such that a wide range of cutting blade sharpnesses produce satisfactory cuts. The method and apparatus are particularly useful for trimming aluminum autobody sheet.

20 Claims, 5 Drawing Sheets

US 6,976,414 B2

METHOD AND APPARATUS FOR TRIMMING ALUMINUM SHEET

This is a division, of application Ser. No. 08/742,976, filed Nov. 1, 1996 now U.S. Pat. No. 5,820,999.

FIELD OF THE INVENTION

The present invention relates to trimming or shearing of aluminum sheet, and more particularly relates to a method and apparatus for reducing sliver production during trimming of sheet such as aluminum autobody sheet.

BACKGROUND INFORMATION

Automotive manufacturers are seeking ways of replacing steel components with aluminum components in order to gain benefits such as reduced weight and improved corrosion resistance. For example, attempts have been made to replace conventional steel autobody sheet with aluminum autobody sheet.

Trimming is an important operation in the autobody sheet forming process. Such trimming operations have conventionally been used to form steel sheet having adequate edge characteristics. When trimmed with dies conventionally designed for steel sheet, aluminum autobody sheet produces unacceptable cut surfaces having slivers, burrs, surface roughness and the like. Slivers are particularly disadvantageous because they cause damage to both the tooling and surface finish of the part. In addition, slivers contaminate the production line.

Sliver production has been recognized by automotive manufacturers as a critical problem in the utilization of aluminum in the automotive industry. Currently, there is no effective procedure for eliminating sliver production during the formation of aluminum autobody sheet. Instead, hand finishing of the formed aluminum parts and hand removal of the slivers are usually employed in production practice. The present invention has been developed in view of the foregoing and to remedy other deficiencies of the prior art.

SUMMARY OF THE INVENTION

An object of the present invention is to control the slivering of aluminum sheet during trimming processes.

Another object of the present invention is to reduce the frequency of tool sharpening required during aluminum sheet trimming operations.

A further object of the present invention is to provide an aluminum sheet trimming operation in which the cutting blade clearance can be varied over a relatively wide range.

Another object of the present invention is to provide a method of trimming aluminum including the steps of cutting the aluminum sheet at a cutting angle and with a cutting blade clearance which substantially eliminate the formation of aluminum slivers.

A further object of the present invention is to provide a method of trimming aluminum sheet including the steps of securing an aluminum sheet at a cutting angle of at least about 10 degrees adjacent a cutting blade, trimming the aluminum sheet at the cutting angle with the cutting blade, and recovering the trimmed aluminum sheet with substantially no slivers.

Another object of the present invention is to provide a method of trimming aluminum sheet including the steps of securing the aluminum sheet between a die and a pad, trimming the aluminum sheet at a cutting blade clearance of greater than about 15% of the thickness of the aluminum sheet, and recovering the trimmed aluminum sheet with substantially no slivers.

A further object of the present invention is to provide an apparatus for reducing sliver production during trimming of aluminum sheet including means for cutting the aluminum sheet, and means for securing the aluminum sheet adjacent the cutting means at a cutting angle of at least about 10 degrees.

Another object of the present invention is to provide a trimmed aluminum sheet substantially free of slivers produced by securing an aluminum sheet at a cutting angle of at least about 10 degrees adjacent a cutting blade, and trimming the aluminum sheet at the cutting angle with the cutting blade.

These and other objects of the present invention will become more apparent from the following description.

DETAILED DESCRIPTION OF THE PREFERRED EMBODIMENTS

Figure 1:
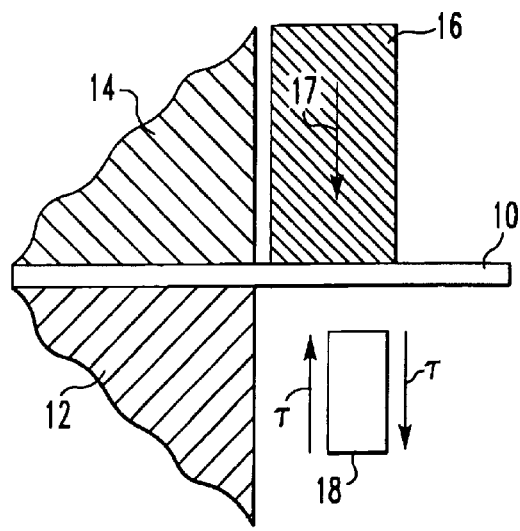
FIG. 1 is a partially schematic illustration of a conventional apparatus for trimming steel autobody sheet.

FIG. 1 schematically illustrates a conventional apparatus for cutting sheet metal such as steel autobody sheet. A metal sheet 10 is sandwiched between a die 12 and a pad 14. A cutting blade 16 travels in the direction 17 adjacent the die 12 and pad 14 to trim the sheet 10. In this apparatus, the strain field 18 comprises a shear strain τ with essentially no normal stress. It is known that for steel sheet, a zero degree cutting angle as shown in FIG. 1 produces the most desirable cut edge and generates the least amount of slivers. Conventional trimming apparatus designs therefore minimize any deviation of the cutting angle from zero degrees. Furthermore, when trimming steel sheet, it is critical to maintain sharp tools and keep clearances below about 8 percent of the metal sheet thickness in order to obtain satisfactory cut edges. However, when such conventional steel sheet trimming methods are applied to aluminum sheet, the use of a zero degree cutting angle has been found to produce an unacceptably high amount of slivers for both 6111-T4 and 6022-T4 aluminum alloy sheets.

Figure 2:
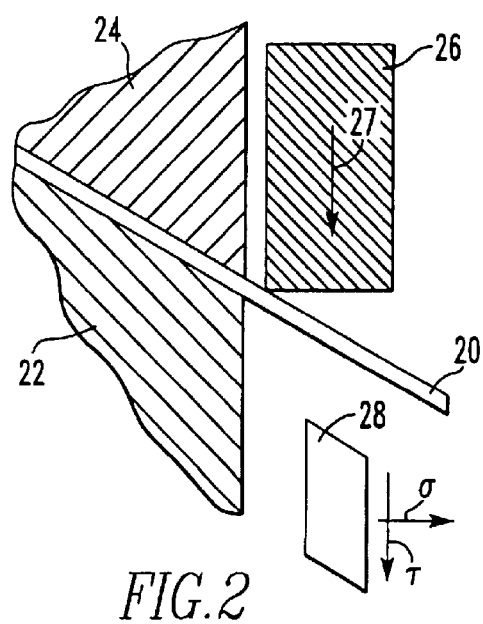
FIG. 2 is a partially schematic illustration of an aluminum sheet trimming apparatus in accordance with an embodiment of the present invention.

FIG. 2 schematically illustrates an apparatus for trimming aluminum sheet in accordance with the present invention. An aluminum sheet 20 is secured between a die 22 and a pad 24. A cutting blade 26 travels in the direction 27 adjacent the die 22 and pad 24 to trim the aluminum sheet 20. The configuration shown in FIG. 2 produces a strain field 28 having a shear strain component τ and a normal stress component σ. In accordance with the present invention, the normal stress component σ is used to improve the cut edge of the aluminum sheet 20 by enhancing ductile fracture.

Figure 3:
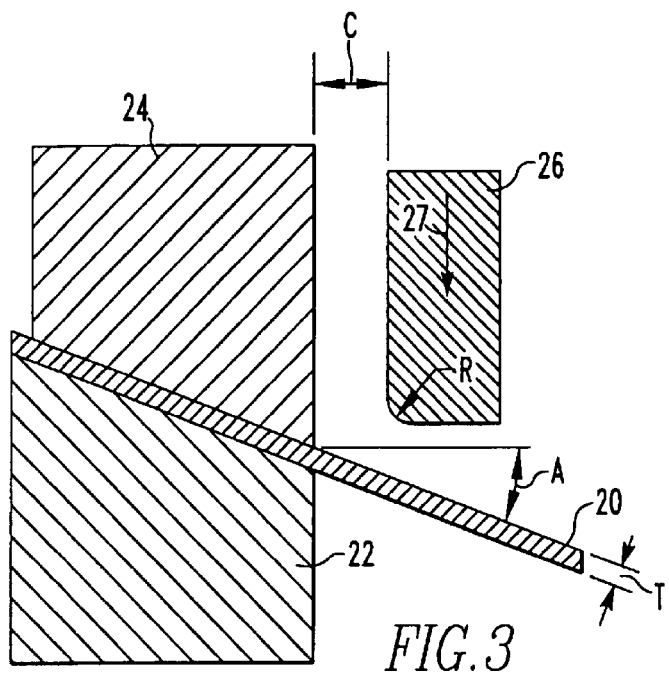
FIG. 3 is a partially schematic illustration of an aluminum sheet trimming apparatus of the present invention, showing the parameters of cutting angle, clearance and tool sharpness.

As shown most clearly in FIG. 3, the aluminum sheet 20 has a thickness T. The sheet thickness T preferably ranges from about 0.5 to about 1.5 mm, more preferably from about 0.7 to about 1.1. mm. For aluminum autobody sheet, the thickness is typically about 1 mm. The aluminum sheet 20 is positioned with a cutting angle A through use of the die 22 and the pad 24 having opposing angled surfaces which contact the surfaces of the aluminum sheet 20. The cutting blade 26 is positioned with a clearance C from the die 22 and pad 24. In accordance with a preferred embodiment, the clearance C is at least about 10 percent of the thickness T of the aluminum sheet 20. In contrast, the clearance used for trimming steel sheet is conventionally kept below about 8 percent of the steel sheet thickness in order to obtain satisfactory cut edges.

As shown in FIG. 3, the cutting blade 26 comprises an edge having a tool sharpness R defined as the blade edge radius. During repeated trimming processes, the cutting blade 26 loses sharpness and becomes increasingly dull with values of R ranging from about 0.002 to about 0.75 mm and higher. In accordance with the present invention, the trimming angle A and clearance C are preferably controlled in order to tolerate a tool sharpness R of at least 0.1 mm (0.004 in.), more preferably at least 0.125 mm (0.005 in.), and most preferably at least 0.25 mm (0.01 in.).

The cutting angle primarily determines the shear stress and normal stress components on the cutting surface of the sheet. A zero degree cut results in the least amount of normal stress. The normal stress component increases as the cutting angle increases. The cutting angle A shown in FIG. 3 used in accordance with the present invention produces a tensile normal stress component which helps the ductile fracture of the aluminum alloy sheet. The cutting angle A used in the trimming operation of the present invention promotes ductile fracture which involves void nucleation, growth and coalescence, as well as the formation and propagation of a localization zone. However, as the cutting angle A increases significantly, the normal stress component becomes so large that the trimming operation can be adversely effected. As discussed more fully below, depending on the particular cutting blade clearance used, the cutting angle A may preferably be greater than about 10 degrees, and more preferably may range from about 10 to about 25 degrees. Such relatively large cutting angles have been found to substantially reduce or eliminate the formation of slivers during the aluminum trimming operation and to permit the satisfactory use of cutting blades for a relatively long time before sharpening is required.

As shown in FIG. 3, the clearance C effects the shear strain level in the deformation zone such that the average shear strain in the deformation zone is equal to the blade travel displacement divided by the clearance. Thus, for the same blade travel displacement, a smaller clearance produces a higher shear strain. In conventional trimming of steel sheet, a small clearance is critical because steel has very high ductility. In contrast, the clearance C used in trimming aluminum alloy sheet can be varied within a relatively wide range. The clearance C is typically greater than about 10 percent of the thickness of the aluminum sheet, preferably from about 10 to about 15 or 20 percent of the thickness of the aluminum sheet.

Figure 4:
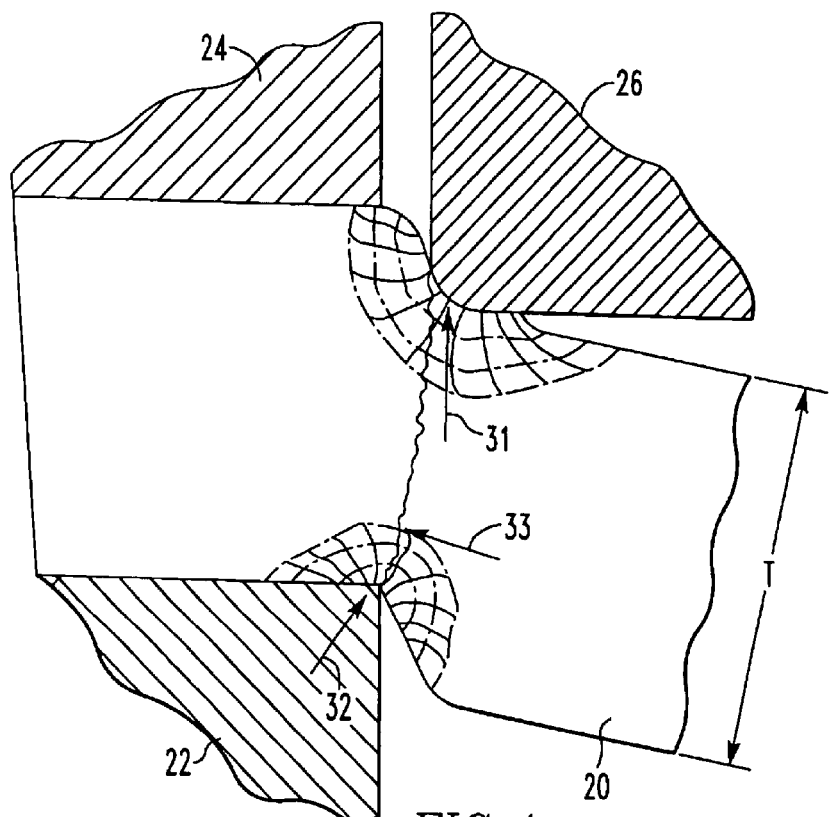
FIG. 4 is a partially schematic illustration of sliver generation during trimming of an aluminum sheet.
Figure 5:
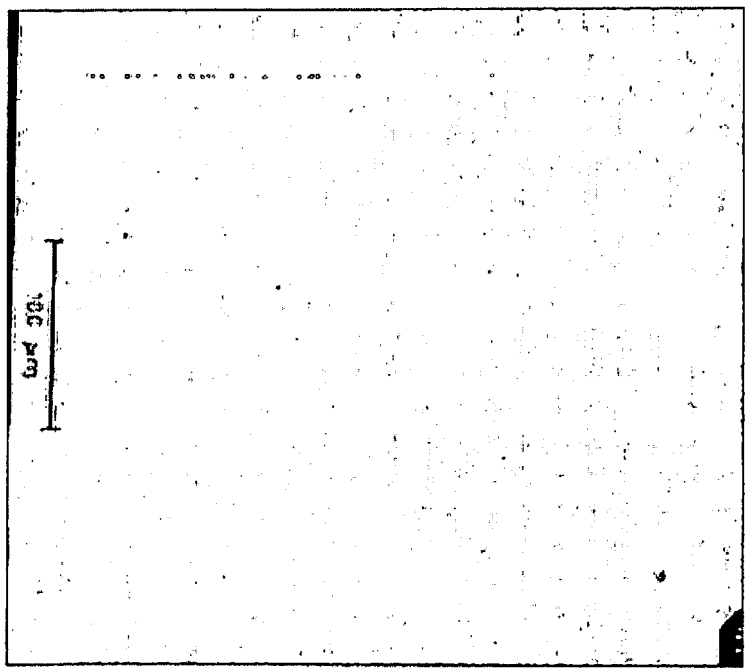
FIG. 5 is a photomicrograph of conventional AKDQ steel autobody sheet at a magnification of 250×.
Figure 6:
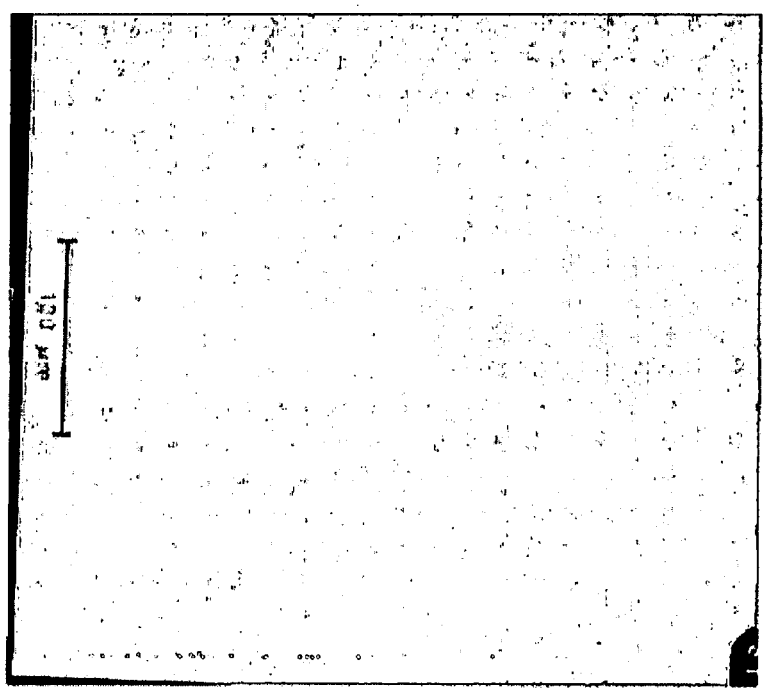
FIG. 6 is a photomicrograph of conventional DQIF steel autobody sheet at a magnification of 250×.
Figure 7:
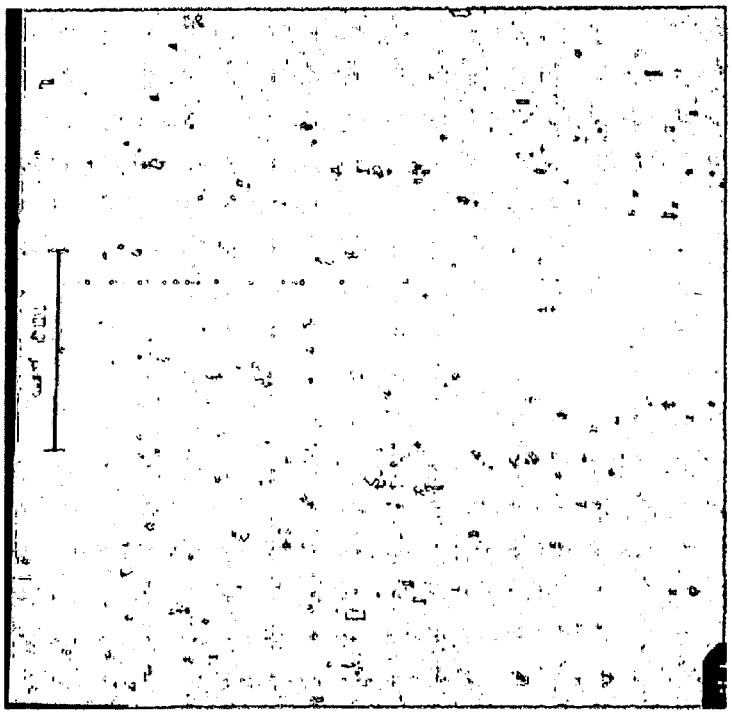
FIG. 7 is a photomicrograph of Aluminum Association 6111-T4 aluminum alloy sheet which may be trimmed in accordance with the present invention, at a magnification of 250×.
Figure 8:
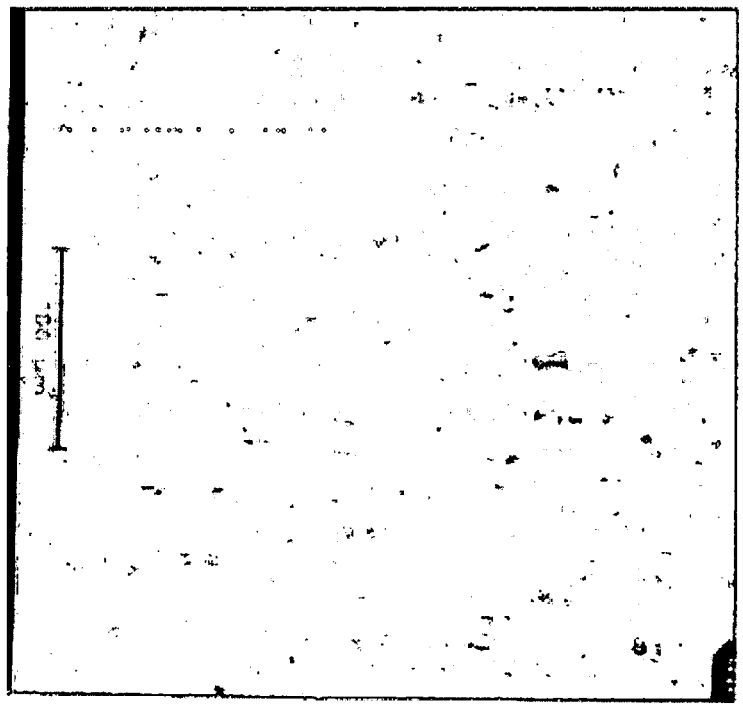
FIG. 8 is a photomicrograph of Aluminum Association 6022-T4 aluminum alloy sheet which may be trimmed in accordance with the present invention, at a magnification of 250×.

FIG. 4 illustrates an aluminum sheet 20 being trimmed. About 80 percent of slivers occur at the blade contact zone 31, with minor amounts of slivers occurring at the burr area 32 or fracture surface 33.

In trimming operations, a sharp blade results in more concentrated deformation than a dull blade. The highly concentrated stresses produced by a sharp blade result in highly concentrated strain or strain localization. It has been conventionally recognized that sharper tools perform better in the trimming process than dull tools. However, in accordance with the present invention, the cutting angle A and the clearance C used in trimming aluminum alloy sheet are preferably controlled in a manner that allows relatively dull blades to shear the aluminum sheet satisfactorily.

In accordance with the present invention, the cutting condition for aluminum alloys such as 6111-T4 differs substantially from the cutting condition for conventional steel sheet. As shown in FIGS. 4–8, steel and aluminum alloys have fundamentally different microstructures. The AKDQ steel sheet shown in FIG. 5 and the DQIF steel sheet shown in FIG. 6 have a clean microstructure having very few if any precipitates, dispersoids and constituents. In contrast, the 6111-T4 aluminum sheet shown in FIG. 7 and the 6022-T4 aluminum alloy sheet shown in FIG. 8 contain substantially more precipitates, dispersoids and constituents. These second phase particles make the fracture of aluminum alloys much more sensitive to tensile stresses than steel, which has significantly higher ductility than aluminum alloys. Other microstructural differences between steel and aluminum such as body centered cubic (BCC) and face centered cubic (FCC) crystal structures play important roles in the ductility of the alloys. While trimming of aluminum alloys 6111 and 6022 is primarily disclosed herein, it is to be understood that other alloys may be trimmed in accordance with the present invention. Such additional alloys typically contain similar types and/or amounts of precipitates or dispersoids, and undergo ductile fracture in a manner similar to 6111 and 6022 alloys.

EXAMPLES

The trimming variables evaluated include cutting angle, clearance and blade sharpness. The laboratory tooling used to trim each sheet is capable of cutting sheet with 0°, 5°, 10°, 15°, 20° and 25° trimming angles. The clearances evaluated were 5%, 10%, 15%, 20% and 25% of the sheet thickness for 6111-T4 and 6022-T4 sheets with a nominal thickness of 0.040 in. (1 mm). Six blade sharpnesses were evaluated. The blade sharpness is quantified by the cutting edge radius. The sharpest one had a cutting edge radius of 0.0001–0.0004 in. (2–10 $\mu$m). Other blade sharpnesses evaluated were 0.001 in. (25 $\mu$m), 0.002 in. (50 $\mu$m), 0.005 in. (125 $\mu$m), 0.010 in. (0.25 mm), and 0.020 in. (0.5 mm). The reason for the sharpest blades not having a definite cutting edge radius is that their edge radii were too small to be exactly quantified on the available measuring device. In addition, such sharp blades would wear after only a few cuts and their sharpnesses would vary.

A total of 130 cutting conditions were evaluated. These conditions included different combinations of cutting angles, clearances and blade sharpnesses. The dimensions of the sheet test samples were 1.5 in.×5.0 in. All samples were tested under unlubricated conditions using straight blades/pads. Within each cutting condition, the effects of sheet orientation were evaluated with samples prepared parallel to and transverse to the rolling direction. About 1,500 samples for each of the two aluminum alloys were tested. For comparison, selected cutting conditions were evaluated for 0.031 in. (0.79 mm) AKDQ steel automotive sheet and 0.029 in. (0.74 mm) DQIF steel automotive sheet.

The observations were focused on the sliver generation. However, the severity of burr formation and the quality of the cut surface are also of concern. The severity of the burr is quantified by the burr height. The quality of the cut surface is represented by its roughness.

Table 1 and Table 2 summarize the results of 6111-T4 and 6022-T4 cut with the sharpest blades which had edge radii R of 0.0001–0.0004 in. (2–10 $\mu$m). The cut surface quality is generally acceptable for all cutting conditions with such blade sharpnesses.

As the clearance or cutting angle increases, the burnish area and the secondary-burnish area decrease while the fracture area increases. Hairlike slivers generated by the cuts along the longitudinal (rolling) direction appear longer than those generated by the cuts perpendicular to the longitudinal (rolling) direction. There is no distinguishable difference in burr height and cut surface quality between the cuts along or perpendicular to the longitudinal (rolling) direction.

Table 3 and Table 4 present the results for 6111-T4 and 6022-T4 cut with the blades of cutting edge radii R of 0.001 in. (25 $\mu$m) and 0.002 in. (50 $\mu$m), respectively. These two blade sharpnesses produce very similar results. The 0.002 in. blade generates slightly bigger (wider) pieces of hairlike slivers and slightly higher burrs than the 0.001 in. blade. The cut surface quality is generally acceptable for all cutting conditions with these two blade sharpnesses. As the clearance C or cutting angle A increases, the burnish area and the secondary burnish area decrease while the fracture area increases. The secondary burnish area eventually disappears as clearance and cutting angle increase. Hairlike slivers generated by the cuts along the longitudinal (rolling) direction appear longer than those generated by the cuts perpendicular to the longitudinal (rolling) direction.

The appearance of slivers changes when the blade edge radius reaches 0.005 in. (125 $\mu$m). The amount of hairlike slivers is drastically reduced. However, they are replaced by slivers of large metal pieces and small particles. The cut surface quality declines compared to the cuts by blades with sharpnesses of 0.0001–0.0002 in., 0.001 in. and 0.002 in. Table 5 summarizes the results for 6111-T4 and 6022-T4 for the blades of 0.005 in. With this blade sharpness and small cutting angles (0–10 degrees) and for large clearances (15–25%), the roughness of the cut surface increases significantly as the clearance increases.

Table 6 and Table 7 show the results of 6111-T4 and 6022-T4 trimmed by blades with cutting edge radii of 0.010 in. (0.25 mm) and 0.020 in. (0.50 mm). These blades are considered very dull for cutting sheets of 0.040 in. (1 mm) thick. With these blades, although almost no hairlike slivers are generated, the slivers are in the form of either large metal pieces or small particles. However, with 15–25 degree cutting angles and 5–10% clearances, no slivers in any form are generated and the burr is minimal for blades with edge radii up to 0.020 in. The quality of the cut surface is also very good.

It is observed that the majority of slivers occur during the down stroke. The press used for the testing is a two-step press. It can be interrupted after the down stroke and then resumed for the back stroke. The conclusion that the majority of slivers occur during the down stroke is also reached from intensive micrographic investigations to trace the origin of slivers.

About 150 steel samples were cut under selected combinations of cutting angle, clearance and blade sharpness. The restrictions placed on trimming angle, clearance and blade sharpness for cutting steel sheets are due to concerns about being able to cut off the metal with acceptable burr heights and good cut surfaces. Table 8 shows the representative maximum clearance and blade sharpnesses for cutting DQIF steel sheet.

TABLE 1

| | 6111-T4 (BLADE SHARPNESS = 0.0001–0.0004 In.) | | | | | |
|---|---|---|---|---|---|---|
| | 0 Degree | 5 Degree | 10 Degree | 15 Degree | 20 Degree | 25 Degree |
| 5% Clearance | Significant amount fine hairlike slivers; slight burr on edge | Some fine hairlike slivers; slight burr on edge | Almost no slivers; very slight burr on edge | No slivers; minimal burr on edge | No slivers; minimal burr on edge | No slivers; minimal burr on edge |
| 10% Clearance | Some fine hairlike slivers; slight burr on edge | Some slivers; slight burr on edge | No slivers; slight burr on edge | No slivers; minimal burr on edge | No slivers; minimal burr on edge | No slivers; minimal burr on edge |
| 15% Clearance | Almost no slivers; slight to medium burr on edge | Almost no slivers; slight to medium burr on edge | No slivers; slight burr on edge | No slivers, very slight burr on edge | No slivers; minimal burr on edge | No slivers; minimal burr on edge |
| 20% Clearance | No slivers; medium burr on edge | No slivers; medium burr on edge | No slivers; very slight medium burr on edge | No slivers; very slight burr on edge | No slivers; very slight burr on edge | No slivers; minimal burr on edge |
| 25% Clearance | No slivers; medium burr on edge | No slivers; medium burr on edge | No slivers; slight to medium burr on edge | No slivers; slight burr on edge | No slivers; very slight burr on edge | No slivers; very slight burr on edge |

Note:
(1) The cutting surface quality is generally acceptable for all cutting conditions.
(2) As clearance increases, the burnish area and secondary-burnish area decrease, the fracture area increases.
(3) As cutting angle increases, the burnish area and secondary-burnish area decrease, the fracture area increases.
(4) Cuts along the longitudinal (rolling) direction produce longer pieces of slivers than the cuts perpendicular to the longitudinal (rolling) direction.

TABLE 2

| | 6022-T4 (BLADE SHARPNESS = 0.0001–0.0004 In.) | | | | | |
|---|---|---|---|---|---|---|
| | 0 Degree | 5 Degree | 10 Degree | 15 Degree | 20 Degree | 25 Degree |
| 5% Clearance | Significant amount fine hairlike slivers; slight burr on edge | Many fine hairlike slivers; very slight burr on edge | Little to no slivers; very slight burr on edge | Almost no slivers; minimal burr on edge | No slivers; minimal burr on edge | No slivers; minimal burr on edge |
| 10% Clearance | Many fine hairlike slivers; slight burr on edge | Many slivers; very slight burr on edge | Almost no slivers; slight burr on edge | No slivers; minimal burr on edge | No slivers; minimal burr on edge | No slivers; minimal burr on edge |
| 15% Clearance | A few slivers; slight to medium burr on edge | A few slivers; slight to medium burr on edge | No slivers; slight burr on edge | No slivers, very slight burr on edge | No slivers; minimal burr on edge | No slivers; minimal burr on edge |
| 20% Clearance | Almost no slivers; medium burr on edge | No slivers; medium burr on edge | No slivers; slight to medium burr on edge | No slivers; very slight burr on edge | No slivers; very slight burr on edge | No slivers; minimal burr on edge |
| 25% Clearance | No slivers; medium burr on edge | No slivers; medium burr on edge | No slivers; slight to medium burr on edge | No slivers; slight burr on edge | No slivers; very slight burr on edge | No slivers; very slight burr on edge |

Note:
(1) The cutting surface quality is generally acceptable for all cutting conditions.
(2) As clearance increases, the burnish area and secondary-burnish area decrease, the fracture area increases.
(3) As cutting angle increases, the burnish area and secondary-burnish area decrease, the fracture area increases.
(4) Cuts along the longitudinal (rolling) direction produce longer pieces of slivers than the cuts perpendicular to the longitudinal (rolling) direction.

TABLE 3

|  | 0 Degree | 10 Degree | 20 Degree | 25 Degree |
|---|---|---|---|---|
| 6111-T4 (BLADE SHARPNESS = 0.001 in.) | | | | |
| 5% Clearance | Significant amount of long hairlike slivers; slight burr | Some hairlike slivers; very slight burr | No slivers; minimal burr | No slivers; minimal burr |
| 10% Clearance | Many hairlike slivers; slight to medium burr | A few slivers; slight burr | No slivers; minimal burr | No slivers; minimal burr |
| 15% Clearance | Some slivers; slight to medium burr | No slivers; slight burr | No slivers; slight burr | No slivers; very slight burr |
| 20% Clearance | No slivers; medium burr | No slivers; slight to medium burr | No slivers; slight burr | No slivers; slight burr |
| 25% Clearance | No slivers; medium burr | No slivers; medium burr | No slivers; medium burr | No slivers; slight burr |
| 6022-T4 (BLADE SHARPNESS = 0.001 in.) | | | | |
| 5% Clearance | Significant amount of long hairlike slivers; slight burr | Many hairlike slivers; very slight burr | No slivers; minimal burr | No slivers; minimal burr |
| 10% Clearance | Many hairlike slivers; slight to medium burr | Some slivers; slight burr | No slivers; minimal burr | No slivers; minimal burr |
| 15% Clearance | Some slivers; slight to medium burr | No slivers; slight burr | No slivers; slight burr | No slivers; very slight burr |
| 20% Clearance | No slivers: medium burr | No slivers; slight to medium burr | No slivers; slight burr | No slivers; slight burr |
| 25% Clearance | No slivers: medium burr | No slivers; medium burr | No slivers; medium burr | No slivers; slight burr |

Note:
(1) Cuts along the longitudinal (rolling) direction produce longer pieces of slivers than the cuts perpendicular to the longitudinal direction.
(2) With this blade sharpness, the cutting surface quality is generally acceptable for all cutting conditions.
(3) As clearance increases, the burnish area and secondary-burnish area decrease, the fracture area increases.
(4) As cutting angle increases, the burnish area and secondary-burnish area decrease, the fracture area increases.
(5) As clearance and cutting angle increase, the secondary-burnish area eventually disappears.

TABLE 4

|  | 0 Degree | 10 Degree | 20 Degree | 25 Degree |
|---|---|---|---|---|
| 6111-T4 (BLADE SHARPNESS = 0.002 in.) | | | | |
| 5% Clearance | Significant amount of hairlike slivers slight to medium burr | Many hairlike slivers; very slight burr | No slivers; minimal burr | No slivers; minimal burr |
| 10% Clearance | Many hairlike slivers; slight to medium burr | A few slivers; slight burr | No slivers; minimal burr | No slivers; minimal burr |
| 15% Clearance | Some slivers; medium burr | No slivers; slight to medium burr | No slivers; slight burr | No slivers; very slight burr |
| 20% Clearance | No slivers; medium burr | No slivers; slight to medium burr | No slivers; slight to medium burr | No slivers; slight burr |
| 25% Clearance | No slivers; medium burr | No slivers; medium burr | No slivers; medium burr | No slivers; slight to medium burr |
| 6022-T4 (BLADE SHARPNESS = 0.002 in.) | | | | |
| 5% Clearance | Significant amount of hairlike slivers; slight to medium burr | Some hairlike slivers; very slight burr | No slivers; minimal burr | No slivers; minimal burr |
| 10% Clearance | Many hairlike slivers; slight to medium burr | Some slivers; slight burr | No slivers; minimal burr | No slivers; minimal burr |
| 15% Clearance | Some slivers; medium burr | No slivers; slight to medium burr | No slivers; slight burr | No slivers; very slight burr |
| 20% Clearance | No slivers; medium burr | No slivers; slight to medium burr | No slivers; slight to medium burr | No slivers; slight burr |
| 25% Clearance | No siivers; medium burr | No slivers; medium burr | No slivers; medium burr | No slivers; slight to medium burr |

Note:
(1) With this blade sharpness, the cuting surface quality is generally acceptable for all cutting conditions.
(2) Cuts along the longitudinal (rolling) direction produce longer pieces of slivers than the cuts perpendicular to the longitudinal (rolling) direction.

TABLE 5

|  | 0 Degree | 10 Degree | 20 Degree | 25 Degree |
|---|---|---|---|---|
| 6111-T4 (BLADE SHARPNESS = 0.005 in.) | | | | |
| 5% Clearance | A few hairlike sliver and some large peice slivers and particles medium burr, fair cutting surface | Almost no hairlike slivers, some large pieces slivers and particles; slight burr, fair cutting surface | No slivers; minimal burr, good cutting surface | No slivers; minimal burr, good cutting surface |

TABLE 5-continued

|  | 0 Degree | 10 Degree | 20 Degree | 25 Degree |
|---|---|---|---|---|
| 10% Clearance | Almost no hairlike slivers, some large pieces slivers and particles; medium burr, fair cutting surface | Almost no hairlike slivers; a few large piece slivers; medium to high burr rought cutting surface | No slivers, minimal burr, fair cutting surface | No slivers; minimal burr, fair cutting surface |
| 15% Clearance | Almost no hairlike slivers; a few large piece slivers; medium to high burr fair cutting surface | No sliver; medium to high burr rough cutting surface | No slivers; medium burr, rough cutting surface | No slivers; slight to medium burr, rough cutting surface |
| 20% Clearance | No slivers; medium to high burr, rough cutting surface | No slivers; high burr, very rough cutting surface | No slivers; medium to high burr, very rough cutting surface | No slivers; medium burr, very rough cutting surface |
| 25% Clearance | No slivers, high burr, rough cutting surface | No slivers, high burr, very rough cutting surface | No slivers, high burr very rough cutting surface | No slivers; medium to high burr rough cutting surface |
| | | 6022-T4 (BLADE SHARPNESS = 0.005 in.) | | |
| 5% Clearance | A few hairlike sliver and some large peice slivers and particles medium burr, fair cutting surface | Almost no hairlike slivers, some large pieces slivers and particles; slight burr, fair cutting surface | No slivers; minimal burr, good cutting surface | No slivers; minimal burr, good cutting surface |
| 10% Clearance | Almost no hairlike slivers, some large pieces slivers and particles; medium burr, fair cutting surface | Almost no hairlike slivers; a few large piece slivers; medium to high burr rought cutting surface | No slivers, minimal burr, fair cutting surface | No slivers; minimal burr, fair cutting surface |
| 15% Clearance | Almost no hairlike slivers; a few large piece slivers; medium to high burr fair cutting surface | No sliver; medium to high burr rough cutting surface | No slivers; medium burr, rough cutting surface | No slivers; slight to medium burr, rough cutting surface |
| 20% Clearance | No slivers; medium to high burr, rough cutting surface | No slivers; high burr, very rouhg cutting surface | No slivers; medium to high burr, very rough cutting surface | No slivers; medium burr, very rough cutting surface |
| 25% Clearance | No slivers, high burr, rough cutting surface | No slivers, high burr, very rough cutting surface | No slivers, high burr very rough cutting surface | No slivers; medium to high burr rough cutting surface |

Note:
(1) Cuts along the longitudinal (rolling) direclion produce longer pieces of slivers than the cuts perpendicular 10 the longitudinal (rolling) direction.
(2) With this blade sharpness. for clearance of 15–25%, Ihe cutting surface roughness tends to increase as the cutting angle increases.

TABLE 6

|  | 0 Degree | 10 Degree | 20 Degree | 25 Degree |
|---|---|---|---|---|
| | | 6111-T4 (BLADE SHARPNESS = 0.010 in.) | | |
| 5% Clearance | Almost no hairlike sliver and many large piece slivers and particles, high burr, rough cutting surface | Almost no hairlike slivers, some large pieces slivers and particles minimal burr, fail cutting surface | No slivers, minimal burr, good cutting surface | No slivers, minimal burr, good cutting surface |
| 10% Clearance | No hairlike slivers, some large pieces slivers and and particles; very high burr, rough cutting surface | No hairlike slivers, a few large piece slivers; high burr unacceptably rough cutting surface | No slivers, minimal burr, good cutting surface | No slivers, minimal burr, good cutting surface |
| 15% Clearance | No hairlike slivers, a few large piece slivers; very high burr, rough cutting surface | No slivers, high burr, unacceptably rough cutting surface | No slivers, high burr, rough cutting surface | No slivers, high burr rough cutting surface |
| 20% Clearance | No slivers, extremely high burr, very rough cutting surface | No slivers, very high burr, unacceptable rough cutting surface | No slivers, high burr, unacceptably rough cutting surface | No slivers; high burr, unacceptable rough cutting surface |
| 25% Clearance | No slivers, extremely high burr, very rough cutting surface | No slivers; extremely high burr, unacceptably rough cutting surface | No slivers; extremely high burr, unacceptably rough cutting surface | No slivers, very high burr, unaccetably rough cutting surface |
| | | 6022-T4 (BLADE SHARPNESS = 0.010 in.) | | |
| 5% Clearance | Almost no hairlike sliver and many large piece slivers and particles, high burr, rough cutting surface | Almost no hairlike slivers, some large pieces slivers and minimal burr, fail cutting surface | No slivers, minimal burr, good cutting surface | No slivers, minimal burr, good cutting surface |
| 10% Clearance | No hairlike slivers, some large pieces slivers and and particles; very high burr, rough cutting surface | No hairlike slivers, a few large piece slivers; high burr unacceptably rough cutting surface | No slivers, minimal burr, good cutting surface | No slivers, minimal burr, good cutting surface (#) |
| 15% Clearance | No hairlike slivers, a few large piece slivers; very high burr, rough cutting surface | No slivers, high burr, unacceptably rough cutting surface | No slivers, high burr, rough cutting surface | No slivers, high burr rough cutting surface |

TABLE 6-continued

|  | 0 Degree | 10 Degree | 20 Degree | 25 Degree |
|---|---|---|---|---|
| 20% Clearance | No slivers, extremely high burr, very rough cutting surface | No slivers, very high burr, unacceptable rough cutting surface | No slivers, high burr, unacceptably rough cutting surface | No slivers; high burr, unacceptable rough cutting surface |
| 25% Clearance | No slivers, extremely high burr, very rough cutting surface | No slivers; extremely high burr, unacceptably rough cutting surface | No slivers; extremely high burr, unacceptably rough cutting surface | No slivers, very high burr, unaccetably rough cutting surface |

Note:
Under same conditions (i.e.. cutting angle. clearance, blade sharpness, alloy, grain orientation), the appearance of cutting surface and burr can be extremely different. Some samples Show minimal burr and good cutting surface, some show high burr and rough cutting surface.

TABLE 7

|  | 0 Degree | 10 Degree | 20 Degree | 25 Degree |
|---|---|---|---|---|
| | | 6111-T4 (BLADE SHARPNESS = 0.020 in.) | | |
| 5% Clearance | No hairlike sliver, many large piece slivers and particles; extremely high burr, unacceptable cutting surface | No hairlike slivers, a few large pieces slivers and particles; minimal burr, good cutting surface | No slivers, minimal burr, good cutting surface | No slivers, minimal burr, good cutting surface |
| 10% Clearance | No hairlike sliver, many large piece slivers and particles; extremely high burr, unacceptable cutting surface | No hairlike slivers; a few large piece slivers; discontinously high burr, discontinously rough cutting surface | No slivers, minimal burr, good cutting surface | No slivers, minimal burr, good cutting surface |
| 15% Clearance | No hairlike sliver, some large pieces slivers and particles; extremely high burr, unacceptable cutting surface | No sliver, extremely high burr, unacceptably rough cutting surface | No slivers; minimal burr, fair cutting surface (#) | No slivers; minimal burr, good cutting surface |
| 20% Clearance | No slivers and particles; extremely high burr, unacceptable cutting surface | No slivers, extremely high burr, unacceptably rough cutting surface | No slivers; discontinuously high burr, discontinuously rough cutting surface | No slivers; discontinuously high burr, discontinuously rough cutting surface |
| 25% Clearance | No slivers and particles; extremely high burr, unacceptable cutting surface | No slivers, extremely high burr, unacceptably rough cutting surface | No slivers, extremely high burr, unacceptably rough cutting surface | No slivers, discontinuously high burr, discontinuously rough cutting surface |
| | | 6022-T4 (BLADE SHARPNESS = 0.020 in.) | | |
| 5% Clearance | No hairlike sliver, many large piece slivers and particles; extremely high burr, unacceptable cutting surface and rough cutting surface | No hairlike slivers, a few large piece slivers and particles, discontinuously high burr | No slivers, minimal burr, good cutting surface | No slivers, minimal burr, good cutting surface |
| 10% Clearance | No hairlike sliver, many large pieces slivers and particles; extremely high burr, unacceptable cutting surface | No hairlike slivers; a few large piece slivers; discontinuously high burr, discontinuously rough cutting surface | No slivers, minimal burr, good cutting surface | No slivers, minimal burr, good cutting surface |
| 15% Clearance | No hairlike sliver, some large pieces slivers and particles; extremely high burr, unacceptable cutting surface | No sliver, extremely high burr, unacceptably rough cutting surface | No slivers; minimal burr, fair cutting surface | No slivers; minimal burr, good cutting surface |
| 20% Clearance | No slivers and particles; extremely high burr, unacceptable cutting surface | No slivers, extremely high burr, unacceptably rough cutting surface | No slivers; discontinuously high burr, discontinuously rough cutting surface | No slivers; discontinuously high burr, discontinuously rough cutting surface |
| 25% Clearance | No slivers and particles; extremely high burr, unacceptable cutting surface | No slivers, extremely high burr, unacceptably rough cutting surface | No slivers, extremely high burr, unacceptably rough cutting surface | No slivers, discontinuously high burr, discontinuously rough cutting surface |

Note:
Under same conditions (i.e cutting angle, clearance, blade sharpness, alloy), cuts perpendicular to the longitudinal direction show minimal burr and good cutting surface, cuts along the longitudinal (rolling) direction show discontinuously high burr and discontinuously rough cutting surface.

TABLE 8

MAXIMUM CLEARANCE AND BLADE SHARPNESS OF CUTTING DQIF STEEL SHEET

| Trimming Angle | Maximum Clearance | Maximum Blade Edge Radius | Remarks |
|---|---|---|---|
| 0 Degree | 13.80% | 0.002 in. | Extremely high and sharp burr, unacceptable cutting surface |

TABLE 8-continued

MAXIMUM CLEARANCE AND BLADE SHARPNESS OF CUTTING DQIF STEEL SHEET

| Trimming Angle | Maximum Clearance | Maximum Blade Edge Radius | Remarks |
| --- | --- | --- | --- |
| 0 Degree | 13.80% | 0.005 in. | Extremely high and sharp burr, unacceptable cutting surface, significant local bending distortion on sheet near the cutting edge |
| 0 Degree | 17.20% | 0.001 in. | Extremely high and sharp burr, unacceptable cutting surface, significant local bending distortion on sheet near the cutting edge |
| 0 Degree | 17.20% | 0.010 in. | Not be able to cut otl the sheet metal |
| 10 Degree | 13.80% | 0.005 in | Not be able to cut ofi the sheet metal |

Figure 9:
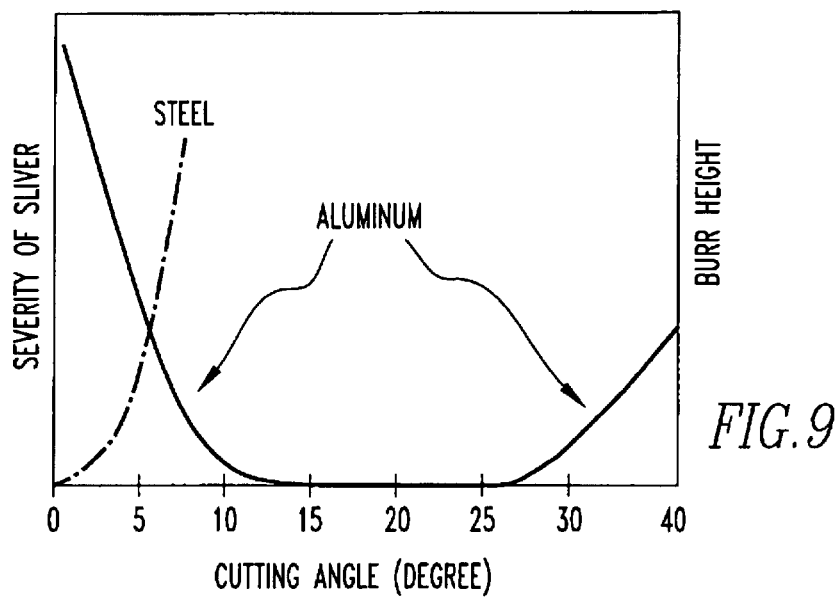
FIG. 9 is a graph showing the effects of cutting angle in trimming steel and aluminum sheet.
Figure 10:
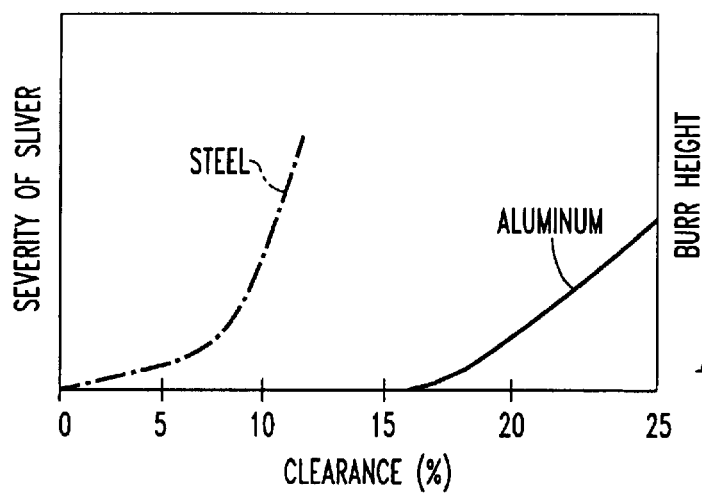
FIG. 10 is a graph showing the effects of cutting blade clearance in trimming steel and aluminum sheet.
Figure 11:
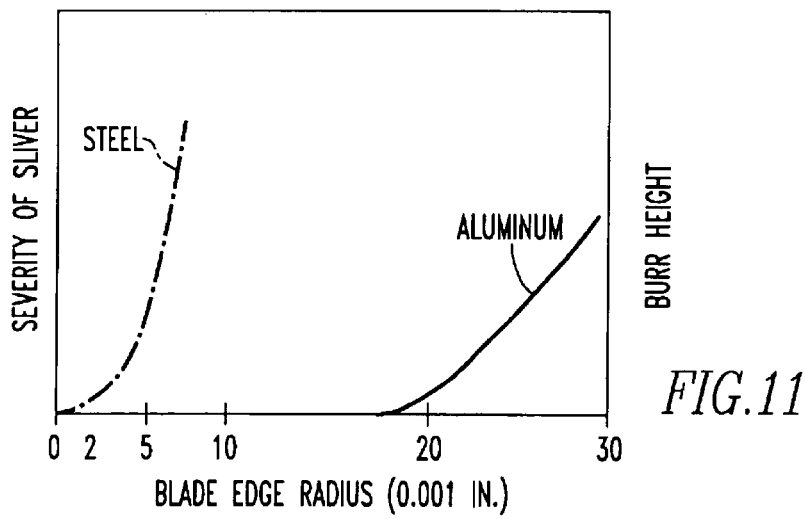
FIG. 11 is a graph showing the effects of tool sharpness in trimming steel and aluminum sheet.

The effects for each individual variable of cutting angle A, clearance C and tool sharpness R are schematically shown in FIGS. 9 to 11, respectively.

The cutting angle required for aluminum sheet differs dramatically from that for steel sheet. The best condition designed for steel results in the largest amount of slivers for aluminum, as shown in FIG. 9. As observed in the present examples, as well as in production trimming lines, slivers are not a problem for steels. A 0° trim gives the best condition to cut off the steel sheets and produces good cut surface quality and the least amount of burr. Therefore, trimming tools conventionally designed for steel sheets require cutting angles as close as possible to 0°. However, the experimental investigation conducted here showed that the 0° cutting generates the largest amount of slivers for both 6111-T4 and 6022-T4. On the contrary, with cutting angles above 15 degrees, slivers were significantly reduced or completely eliminated even with blade radii as dull as 0.020 in. for a wide range of clearances. However, as shown in FIG. 9, as the cutting angle increases and when it reaches a certain value, the burr becomes intolerable and the quality of cut surface is unacceptable even though no slivers are generated.

For steel it is usually desirable to keep clearances at about 7.5% of metal thickness. Above this value, the burr height and cut surface quality become unacceptable and it may even be impossible to cut off the sheet metal, as shown in Table 8. For 6111-T4 and 6022-T4 sheets, with appropriate cutting angles, the clearance can be 15% of the sheet thickness and result in tolerable burr height and acceptable cut surface quality. Consequently, the clearance for aluminum is less restrictive than that for steels as shown in FIG. 10.

Maintaining sharp tools is critical to trim steel sheets. As exhibited in Table 8, when the radius of the cutting blade exceeds 0.005 in. and the clearance exceeds 10%, high and sharp burrs and unacceptable cut surface quality result. However, with appropriate cutting angles for both 6111-T4 and 6022-T4 the blade edge radius can be as dull as 0.020 in. and still produce little or no slivers, low burrs and good cut surface quality, as shown in FIG. 11.

In accordance with the present invention, with appropriate cutting angles, the trimming/blanking of 6111-T4 and 6022-T4 aluminum sheets can be more robust that the trimming/blanking of steel sheets. For the aluminum alloys, the clearances can be less restrictive and tools may require less sharpening because the cutting is less sensitive to the tool sharpness. In addition, a wide range of cutting angles is possible for 6111-T4 and 6022-T4 sheets.

In accordance with the present invention, improved tool design is provided based on the results shown in Tables 1–7. Tool design guidelines for trimming 6111-T4 and 6022-T4 are shown in Table 9. The guidelines specify the clearance and maximum blade edge radius for different ranges of cutting angles. The lower bounds of the clearances are limited by sliver generation. The upper bounds of the clearances are limited by the tolerable burr height. In general, burr height increases as clearance increases and as blade sharpness decreases. Sharper blade results in lower burrs. Blade sharpness also affects the appearance of slivers. Fine hairlike slivers are generated by sharp blades. When the blade gets dull, it generates large metal pieces and particle-like slivers.

TABLE 9

TRIMMING TOOL GUIDELINES FOR 6111-T4 AND 6022-T4

| Trimming Angle | Clearance Per Side | Maximum Blade Edge Radius |
| --- | --- | --- |
| 0 Degree | 15%–20% | 0.003 in. |
| 0–5 Degree | 12.5%–17.5% | 0.004 in. |
| 5–10 Degree | 10%–17.5% | 0.005 in. |
| 10–15 Degree | 7.5%–17.5% | 0.005 in. |
| 15–25 Degree | 5%–20% | 0.010 in. |

NOTE:
(1) All samples were tested with straight cutting blades/pads under dry condition.
(2) The lower bounds of the clearance are limited by the sliver generation. They may be reduced if small amount of slivers is tolerable.
(3) The upper bounds of the clearance are limited by the tolerable burr height.
(4) For all trimming angles, the burr height increases as clearance increases.
(6) In general, the burr height increases as blade sharpness decreases. The sharper the blade, the less the burr.
(7) The blade sharpness also affects the appearance of slivers, e.g., fine halr-like or large metal pieces or particle-like.
(8) With 15–25 degree trimming angle and 5–10% clearance, almost no burr on the edge for blades with sharpness up to 0.020 in.

Overall, to get the best results to eliminate slivers and minimize burr height, it is preferred that the lower bounds of clearances be followed. As cutting angle increases, the clearance window opens up and the requirement for blade sharpness becomes less restrictive as shown in Table 9. Cutting angles A of 20±5 degree are the most preferred cutting conditions for trimming 6111-T4 and 6022-T4. Under such conditions, no slivers were generated in the examples and the burr heights were minimal using blades with edge radii up to 0.020 in.

A cutting angle A of zero degrees is possible if the clearance is increased from 7.5±2.5% (designed for steel) to 15% to 20% of the aluminum sheet thickness. Since burr height increases with blade edge radius, the cutting blade needs to be maintained as sharp as possible to reduce the burr height.

For a quantitative indication of burr severity, the burr heights were measured for 0 degree cutting for different clearances with different blade sharpnesses. The burr heights were measured using micrographs of the cross-sections of trimmed samples. The burr heights are given in Table. 10.

TABLE 10

|  | 0.001 in. | 0.002 in. | 0.005 in. | 0.010 in. | 0.020 in. |
|---|---|---|---|---|---|
| Burr Height of 6111-T4 | | | | | |
| 5% Clearance | 0.05 mm | 0.055 mm | 0.05 mm | 0.06 mm | 0.35 mm |
| 10% Clearance | 0.10 mm | 0.120 mm | 0.140 mm | 0.183 mm | 0.35 mm |
| 15% Clearance | 0.133 mm | 0.133 mm | 0.183 mm | 0.233 mm | 0.35 mm |
| 20% Clearance | 0.15 mm | 0.20 mm | 0.183 mm | 0.233 mm | 0.40 mm |
| 25% Clearance | 0.167 mm | 0.183 mm | 0.233 mm | 0.317 mm | 0.40 mm |
| Burr Height of 6022-T4 | | | | | |
| 5% Clearance | 0.058 mm | 0.117 mm | 0.133 mm | 0.167 mm | 0.317 mm |
| 10% Clearance | 0.133 mm | 0.117 mm | 0.142 mm | 0.183 mm | 0.333 mm |
| 15% Clearance | 0.10 mm | 0.158 mm | 0.183 mm | 0.225 mm | 0.35 mm |
| 20% Clearance | 0.20 mm | 0.15 mm | 0.167 mm | 0.292 mm | 0.367 mm |
| 25% Clearance | 0.15 mm | 0.10 mm | 0.225 mm | 0.292 mm | 0.367 mm |

In accordance with the present invention, the selection of the appropriate cutting angle A results in improved trimming of aluminum sheet in comparison with steel sheet. In addition, the clearance C used in trimming aluminum sheet can be varied within a relatively wide range in comparison with the relatively small clearance required for trimming of steel sheet. Furthermore, the tools used for trimming require less sharpening and allow the use of a relatively dull cutting blades by adjusting the cutting angle and clearance used to trim the aluminum sheet. These advantages result in a robust trimming operation in comparison with conventional steel trimming methods.

Whereas particular embodiments of the present invention have been described herein, it is to be understood that various changes, additions, adaptations and modifications may be made without departing from the scope of the invention, as set forth in the appended claims.

What is claimed is:

1. A method of trimming an edge of an aluminum sheet comprising:

providing a die adjacent to only one side of a cutting blade;

securing the aluminum sheet in the die adjacent the cutting blade, the aluminum sheet extending, at a cutting angle of from about 10 to about 30 degrees measured from a plane perpendicular to a cutting direction of the cutting blade and with a cutting blade clearance of at least 5 percent of the thickness of the aluminum sheet measured between the blade and the die, the cutting blade having a side surface substantially perpendicular to said plane and a bottom surface substantially parallel to said plane, said side surface and said bottom surface intersecting to form a cutting edge; and moving the cutting blade in the cutting direction and trimmed the aluminum sheet at the cutting angle and with the cutting blade clearance to thereby produce a trimmed aluminum sheet with substantially no slivers.

2. The method of claim 1, wherein the cutting angle is from about 15 to about 25 degrees and the clearance is from about 5 to about 20 percent of the thickness of the aluminum sheet.

3. The method of claim 2, wherein the cutting blade has a maximum cutting edge radius of up to about 0.25 mm.

4. The method of claim 1, wherein the cutting angle is from about 10 to about 15 degrees and the clearance is from about 7.5 to about 17.5 percent of the thickness of the aluminum sheet.

5. The method of claim 4, wherein the cutting blade has a maximum cutting edge radius of up to about 0.125 mm.

6. The method of claim 1, wherein the clearance is from about 10 to about 17.5 percent of the thickness of the aluminum sheet.

7. The method of claim 6, wherein the cutting blade has a maximum cutting edge radius of up to about 0.125 mm.

8. The method of claim 1, wherein the clearance is from about 12.5 to about 17.5 percent of the thickness of the aluminum sheet.

9. The method of claim 8, wherein the cutting blade has a maximum cutting radius of up to about 0.1 mm.

10. A method of trimming an edge of an aluminum sheet comprising:

providing a die and a pad adjacent to only one side of a cutting blade;

securing the aluminum sheet between the die and the pad at a cutting angle of from about 10 to about 30 degrees adjacent a cutting blade wherein the cutting angle of the aluminum sheet is measured from a plane perpendicular to a cutting direction of the cutting blade that is adjacent to the aluminum sheet, and with a cutting blade clearance of at least about 5 percent of the thickness of the aluminum sheet measured between the blade and the die, the cutting blade having a side surface substantially perpendicular to said plane and a bottom surface substantially parallel to said plane, said side surface and said bottom surface intersecting to form a cutting edge; and moving the cutting blade in the cutting direction and trimming the aluminum sheet at the cutting angle and with the cutting blade clearance to thereby produce a trimmed aluminum sheet with substantially no slivers.

11. The method of claim 10, wherein the cutting angle is from about 15 to about 25 degrees.

12. The method of claim 10, wherein the clearance is at least about 10 percent of the thickness of the aluminum sheet.

13. The method of claim 12, wherein the clearance is at least about 5 percent and less than about 20 percent of the thickness of the aluminum sheet.

14. The method of claim 12, wherein the clearance is from about 10 to about 17.5 percent of the thickness of the aluminum sheet.

15. The method of claim 14, further comprising providing the cutting blade with an cutting edge radius of up to about 0.25 mm.

16. The method of claim 10, further comprising providing the cutting blade with a cutting edge radius of up to about 0.75 mm.

17. The method of claim 10, wherein the aluminum sheet comprises an alloy selected from the group consisting of Aluminum Association alloys 6111 and 6022.

18. The method of claim 17, wherein the aluminum sheet comprises aluminum alloy 6111-T4.

19. The method of claim 17, wherein the aluminum sheet comprises aluminum alloy 6022-T4.

20. The method of claim 10, wherein the aluminum sheet comprises an autobody sheet.

* * * * *